Jan. 9, 1968  P. J. BENEDETTO  3,363,216
SAFETY ATTACHMENT FOR ELECTRICAL OUTLET FIXTURES
Filed Oct. 21, 1965

INVENTOR
PATRICK J. BENEDETTO
BY Shanley & O'Neil
ATTORNEYS

United States Patent Office 3,363,216
Patented Jan. 9, 1968

3,363,216
SAFETY ATTACHMENT FOR ELECTRICAL
OUTLET FIXTURES
Patrick J. Benedetto, 599 E. 51st St.,
Hialeah, Fla. 33013
Filed Oct. 21, 1965, Ser. No. 499,193
7 Claims. (Cl. 339—39)

ABSTRACT OF THE DISCLOSURE

Safety attachments for electrical outlet fixtures include fixture covers having hollow bodies for enclosing electrical plugs inserted through the covers into plug receptacles in the fixtures. Flexible cord collars which close the hollow bodies include openings for electrical conduits. The cord collars also include slits extending from the openings to the peripheries of the collars so that the conduits can be inserted into the openings by flexure of the cord collars. Caps are attached to the hollow bodies to hold the cord collars in position.

---

This invention relates to safety devices for electrical outlets and more particularly to a device adapted for attachment to electrical outlet fixtures and which serves as a safety enclosure therefor.

The electrical outlet fixtures commonly used to provide receptacles for plugs provided with electrical appliances and other electrical apparatus possess the disadvantages that they are open to the introduction of foreign objects or substances. This presents a safety hazard to small children or others who by inadvertence or design insert foreign matter into plug receptacles. Even when an electrical plug is inserted into a plug receptacle, the hazard is not completely eliminated because the plug can be accidentally dislodged or removed by curious children, resulting in the exposure of the plug receptacle to the aforementioned dangers.

Therefore, a main object of this invention is to provide a safety enclosure for the plug receptacles of electrical outlet fixtures.

A further object of this invention is to provide a device which serves to prevent inadvertent disengagement of electrical plugs or intentional disengagement thereof by irresponsible persons and which serves as a safety cover whether or not the plug receptacle is in use.

A still further object of the invention is to provide a device which accomplishes all the aforementioned objects, yet is easily detachable by responsible persons for ready access to the plug receptacle.

The foregoing and other objects are accomplished by this invention, which can be briefly described as a device which is attachable to an electrical outlet fixture having at least one plug receptacle. The device comprises a fixture cover member having aperture means adapted for alignment with the plug receptacles in the fixture. Hollow body means are included in the cover member and define an enclosure for the plug receptacle and for plugs inserted therein. The aperture means are closed by cord collar means which are held in position closing the aperture means by cap means which are removably attached to the cover member. The closure means permit the passage of electrical conductive means such as those associated with electrical plugs.

These and other features, objects and advantages of the invention will appear more fully from the following detailed description which, when considered in conjunction with the accompanying drawings, discloses several embodiments of the invention for purposes of illustration only. For definition of the limits of the invention, reference may be had to the appended claims.

In the drawings, where similar reference characters denote similar elements throughout the several views.

Figure 1:
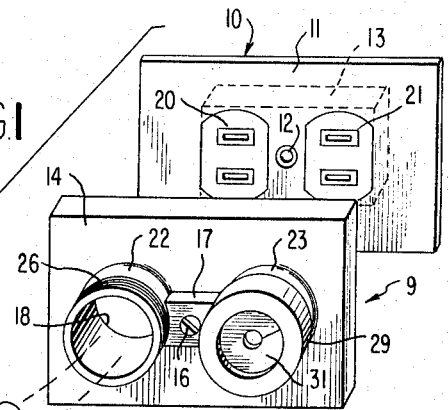
FIGURE 1 is an exploded view in perspective of an apparatus embodying the principles of the invention, shown in position before an electrical outlet fixture.

Referring to the drawings in greater detail, in FIGURE 1, the safety attachment made pursuant to the principles of the invention is illustrated in position before an electrical outlet fixture of conventional design indicated generally at 10. Such fixtures are conventionally provided with an internally disposed member, shown in phantom lines at 13, which includes an aperture as at 12 that is internally threaded to receive a screw which holds the face plate 11 of the fixture in position.

The safety attachment, generally indicated at 9, made according to the principles of the invention, comprises a fixture cover member which in the embodiment illustrated in FIGURE 1 takes the general configuration of a plate as indicated at 14. The plate 14 is attachable to the fixture 10 by means of screw 16 threadedly engaged in aperture 12. Screw 16 can be supported in cover plate 14 on a shoulder such as 17, as shown, or in any other convenient manner. It will be apparent that the safety attachment 9 can be placed over the fixture face plate 11 or used in lieu thereof. The safety attachment 9 is apertured as at 18 to provide access to the individual plug receptacles 20, 21 of the fixture 10 for electrical plugs such as 24 with which electrical appliances are conventionally equipped. Although the fixture illustrated is a conventional fixture of the duplex type, safety attachments embodying the principles of the invention are operable to protect fixtures with any number of plug receptacles and are accordingly within the contemplation of the invention. Included in the fixture cover plate 14, extending thereform, and circumscribing the periphery of each aperture 18 is a hollow body, which preferably is of tubular configuration, as indicated at 22 and 23. Each hollow body, together with the fixture 10 and a cord collar such as 30 to be more fully described later, defines an enclosure that is sufficiently large to contain an electrical connective means such as a plug indicated at 24. The hollow body illustrated at 22 is externally threaded at its outer end as at 26 so as to engage internally threaded cap 28 which will be more fully described hereinbelow. However, it is contemplated that any readily disengageable means of fastening a cap 28 to a hollow body other than by threaded engagement may be utilized without departing from the principles of the invention.

Figure 2:
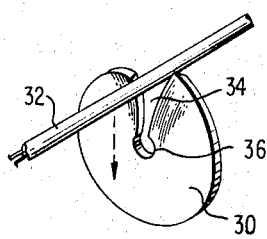
FIGURE 2 is a perspective view of a cord collar element of a combination embodying the principles of the invention, shown disposed to receive an electrical cord.

A cord collar 30 is shown in FIGURE 1 disposed in position on a cord, wire or other electrically conductive means 32. The cord collar preferably takes the form of disc, constructed of a material such as rubber, plastic, metal or other material that possesses sufficient elasticity to allow flexure of the cord collar in the manner indicated in FIGURE 2 for insertion of the conduit 32 through slit 34 into the opening 36 provided in the collar 30 for passage of the cord, yet insure that the cord collar will spring back into its original shape. In the original unflexed shape of the cord collar in this embodiment, the two sides of the slit are preferably in mutual contact or substantially so. In any event they must be in such proximity to each other as to present little or no gap therebetween for the insertion of foreign articles. This can be accomplished in the manufacture of the cord collar by fabricating the slit in a fashion that will remove little or no material, as by cutting.

As indicated above, the cord collar 30 forms the closure for the outer end of the hollow body 22. It is held securely in position by cap 28 removably attachable to the hollow body at 26. In operation, the safety attachment 9 is secured to the fixture 10 by engagement of screw 16 in aperture 12, and the assembly comprising the cord collar 30 and cap 28 is removed from the hollow body 22. The cap 28 is passed over the plug 24 as shown in FIGURE 1, the cord collar is disposed upon the cord 32 in the manner shown in FIGURE 2, and the plug 24 is inserted in the plug receptacle 20. The cord collar is then passed up the cord into disposition adjacent the end 26 of the hollow body 22 and the cap 28 is passed up to threadedly engage the hollow body 22 at 26, thereby enclosing the electrical plug and preventing its disengagement by accident or by design of irresponsible persons, such as children, with concomitant exposure of the plug receptacle to introduction of foreign objects or substances. It will be noted that even when no cord is present in the receptacle as is the case with hollow body 23 in FIGURE 1 the safety attachment provides a large measure of protection in that the opportunity for insertion of foreign articles into the plug receptacle 21 has been greatly reduced because of the presence of cord collar 31 and cap 29. However, complete protection can be had as illustrated in FIGURE 3 by the interchanging of imperforate disc 38 for cord collar 30 when the individual plug receptacle is not in use.

Figure 3:
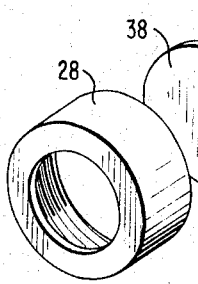
FIGURE 3 is a perspective view of an imperforate disc and cap means used in the invention to cover an electrical outlet when the latter is not in use.
Figure 4:
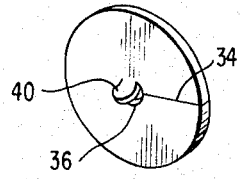
FIGURE 4 is a perspective view of a cord collar constructed with flap means at the cord opening to act as closure means therefor in absence of an electrical cord in the cord opening.

A measure of protection intermediate that afforded by the cord collar as illustrated in FIGURE 1 and the imperforate disc of FIGURE 3 can be had by constructing the cord collar as in FIGURE 4, wherein the opening 36 is provided with at least one flap means 40 which snaps to a closed position when no cord is present in the opening 36 to hold the flap means 40 out of the open position. The snap actuation of the flap means 40 may be provided by the elasticity of the construction material.

Figure 5:
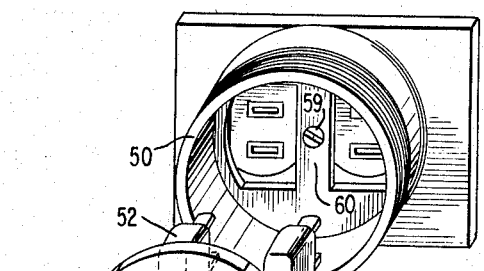
FIGURE 5 is an exploded view in perspective of an apparatus embodying the principles of the invention in which a single tubular body provides access to all plug receptacles.

In FIGURE 5 another safety attachment embodying the principles of the invention is illustrated. In this apparatus one hollow body, indicated at 50, is provided for all plugs, in this case the two plugs 52, 53. A single cord collar 54 is provided as is a single cap 56.

In this embodiment, cord collar 54 is constructed with a separate opening 58 for each plug receptacle. Each opening 58 is equipped with a slit 57 and the manner of inserting cords 32 into the cord collar 54 by flexure of the latter is the same as that involved when only one cord is utilized in each collar. The safety attachment is secured to the wall fixture by screw 59, passed through bar 60 provided for this purpose.

Figure 6:
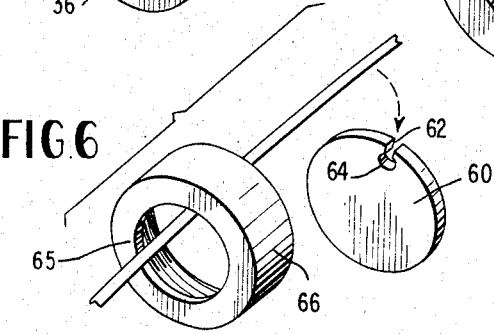
FIGURE 6 is a perspective view of a modified form of the assembly consisting of the cap and cord collar.

FIGURE 6 illustrates a modified construction of the cord collar-cap assembly. In this embodiment, the cord collar may be constructed of rigid material, because flexure thereof for insertion of the cord into the cord collar is unnecessary. In this construction, the slit 62 in the cord collar must be sufficiently wide to permit insertion of the cord without flexure of the cord collar. The opening 64 in the cord collar in this embodiment must be disposed in such proximity to the lip 65 of the cap 66 as to assure that little or none of the slit 62 is exposed to the introduction of foreign articles when the two components are assembled.

What I claim is:
1. A safety attachment for an electrical outlet fixture having at least one plug receptacle, comprising:
    a fixture cover member attachable to the fixture and having aperture means for passing electrical connective means through the cover member into each plug receptacle,
    hollow body means associated with the cover member and circumscribing the aperture means, for enclosing the connective means,
    flexible cord collar means for closing each hollow body means, the cord collar means having opening means for passing an electrical conduit therethrough and slit means extending from the opening means to the periphery of the cord collar means for inserting the conduit into the opening means by flexure of the cord collar means, the slit means having sides at least substantially in contact with one another,
    and cap means removably attachable to the hollow body means for holding the cord collar means in position.

2. A safety attachment as defined in claim 1 wherein the electrical outlet fixture has two plug receptacles.

3. A safety attachment for an electrical outlet fixture having at least one plug receptacle, comprising:
    a fixture cover member attachable to the fixture and having an aperture means for passing electrical connective means through the cover member into each individual plug receptacle,
    hollow body means associated with the cover member, circumscribing the periphery of each individual aperture means and defining an enclosure for each connective means,
    cord collar means for closing each hollow body means, the cord collar means comprising a flexible disc having opening means for passing an electrical conduit therethrough and slit means extending from the opening means to the periphery of the cord collar means, for inserting the conduit into the opening means by flexure of the disc,
    and cap means removably attachable to each hollow body means for holding the cord collar means in position.

4. A safety attachment as defined in claim 3 and further comprising:
    imperforate closure disc means interchangeable with the cord collar disc, for closing each hollow body means when the plug receptacle enclosed thereby is not in use.

5. A safety attachment as defined in claim 3 wherein the electrical outlet fixture has two plug receptacles.

6. A safety attachment as defined in claim 3 and further comprising:
    flap means disposed at the opening means in the cord collar means, for closing the opening means when no conduit is present therein.

7. A safety attachment for an electrical outlet fixture having two plug receptacles, comprising:
    a fixture cover member attachable to the fixture and having a front and a back and two aperture means for passing electrical connective means through the cover member into each of the two plug receptacles individually,
    a hollow body associated with the front of the cover member, circumscribing the periphery of each individual aperture means and defining an enclosure for each connective means, cord collar means for closing each hollow body, the cord collar means comprising a flexible disc having opening means for passing an electrical conduit therethrough and slit means extending from the opening means to the periphery of the cord collar means, for inserting the conduit into the opening means by flexure of the disc, and cap means threadedly attachable to each hollow body for holding the cord collar means in position.

References Cited

UNITED STATES PATENTS

| | | | |
|---|---|---|---|
| 1,965,087 | 7/1934 | Sharp | 339—89 |
| 2,487,900 | 11/1949 | Sopher | 174—67 |
| 3,067,402 | 12/1962 | Thaw | 339—92 |

MARVIN A. CHAMPION, *Primary Examiner.*

J. H. McGLYNN, *Assistant Examiner.*